(12) United States Patent
Ohishi

(10) Patent No.: US 7,117,596 B2
(45) Date of Patent: Oct. 10, 2006

(54) VARIABLE BLADE MANUFACTURING METHOD AND VARIABLE BLADE IN VGS TYPE TURBO CHARGER

(75) Inventor: Shinjiroh Ohishi, Shimada (JP)

(73) Assignee: Akita Fine Blanking Co., Ltd., Shizuoka (JP)

( * ) Notice: Subject to any disclaimer, the term of this patent is extended or adjusted under 35 U.S.C. 154(b) by 0 days.

(21) Appl. No.: 10/485,643

(22) PCT Filed: Aug. 2, 2002

(86) PCT No.: PCT/JP02/07941

§ 371 (c)(1),
(2), (4) Date: Aug. 9, 2004

(87) PCT Pub. No.: WO03/014547

PCT Pub. Date: Feb. 20, 2003

(65) Prior Publication Data

US 2004/0250540 A1    Dec. 16, 2004

(30) Foreign Application Priority Data

Aug. 3, 2001  (JP)  ............................. 2001-235662
Aug. 3, 2001  (JP)  ............................. 2001-235665
Aug. 3, 2001  (JP)  ............................. 2001-235704

(51) Int. Cl.
*B21D 53/78* (2006.01)
*B23P 13/04* (2006.01)
*B23P 15/02* (2006.01)
*F02D 23/00* (2006.01)

(52) U.S. Cl. .................... 29/889.7; 29/889.71; 29/557; 60/602

(58) Field of Classification Search .................. 60/602; 415/159–160, 163–165; 29/889.7, 889.71, 29/34 R, 557
See application file for complete search history.

(56) References Cited

U.S. PATENT DOCUMENTS

| | | | | |
|---|---|---|---|---|
| 4,264,270 A | * | 4/1981 | Geary, Jr. | .................. 415/164 |
| 5,403,161 A | * | 4/1995 | Nealon et al. | ........... 29/889.71 |
| 6,050,775 A | * | 4/2000 | Erdmann et al. | ........... 415/164 |
| 6,453,556 B1 | * | 9/2002 | Watanabe et al. | .......... 29/889.7 |
| 6,699,010 B1 | * | 3/2004 | Jinnai | ......................... 415/164 |

FOREIGN PATENT DOCUMENTS

| | | | |
|---|---|---|---|
| JP | 01041670 A | * | 2/1989 |
| JP | 11-151542 | | 6/1999 |
| JP | 2000-301283 | | 10/2000 |
| KR | 20004038057 A | * | 5/2004 |

* cited by examiner

Primary Examiner—Thai-Ba Trieu
(74) Attorney, Agent, or Firm—Wenderoth, Lind & Ponack, L.L.P.

(57) ABSTRACT

A shaft portion is processed to have a desired diametrical thickness by rolling in place of cutting so that a cutting operation requiring much time may be eliminated from a manufacturing process of the adjustable blade. A shaft elongation and a sharp edge caused by the rolling can be inhibited to thereby eliminate an additional cutting operation conventionally performed for correcting the shaft elongation and the sharp edge. In particular, a metal shaped material for an adjustable blade integrally provided with a blade portion and a shaft portion is formed to have a shape and a size close to those of the desired adjustable blade. In forming the shaft portion, a shaft portion forming section of the shaped material is rolled to have a desired diametrical thickness.

12 Claims, 9 Drawing Sheets

FIG. 8
(a)
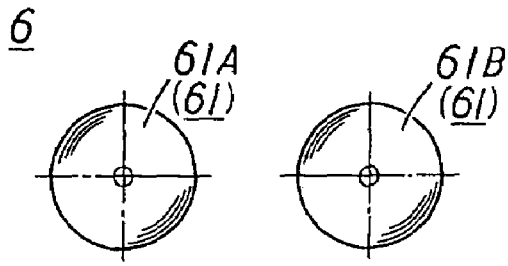
(b)
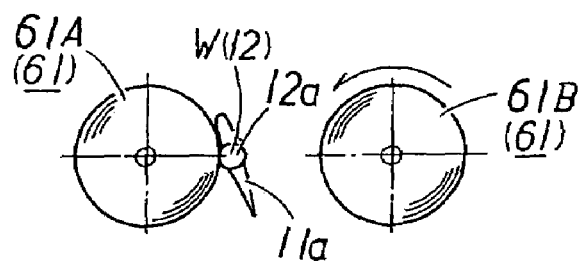
(c)
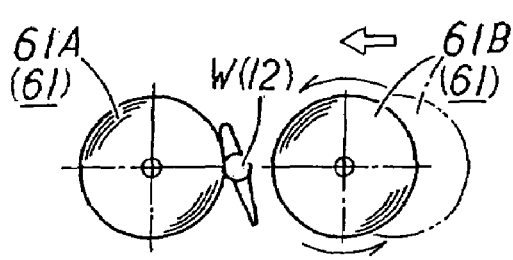
(d)
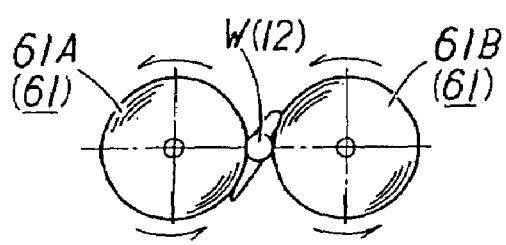

VARIABLE BLADE MANUFACTURING METHOD AND VARIABLE BLADE IN VGS TYPE TURBO CHARGER

TECHNICAL FIELD

The present invention relates to a VGS turbocharger for use in an engine for a motor vehicle or the like, and more particularly to a novel manufacturing method by which a finished product of an adjustable blade to be incorporated in the turbocharger is obtained by applying a cutting operation as little as possible to a shaped material serving as a starting form of the adjustable blade, at the time of manufacturing the adjustable blade.

BACKGROUND ART

A turbocharger is known as a supercharger used for improving the power output and the performance of an automobile engine. The turbocharger is an apparatus in which a turbine is driven by the exhaust energy of the engine to rotate a compressor with the power of the turbine, whereby the engine is supercharged to have more air fed into it than fed into it by natural suction. In the case of an engine capable of running at up to a high rotational speed region, when the engine is running at low rotational speeds, the exhaust turbine of the turbocharger hardly functions due to the reduced flow rate of the exhaust gas, so that the engine can not avoid giving a slow-moving feeling until the exhaust turbine runs efficiently, and necessitating a subsequent time or a so-called turbo-lag before the turbine rapidly reaches the full-running state. Furthermore, in the case of a diesel engine which runs inherently at low rotational speeds, there is a disadvantage that it is difficult to produce an effect of the turbocharger.

Therefore, a VGS turbocharger that works efficiently even when the engine is running at low rotational speeds has been developed. The turbocharger of this type is adapted to obtain a high power output when the engine is running at low rotational speeds by throttling flow of exhaust gas at a low flow rate with adjustable blades (vanes) to increase the velocity of the exhaust gas and increase work of an exhaust turbine. For this reason, in the VGS turbocharger, an adjusting mechanism for the adjustable blades are required additionally, and it is required that the associated constituting parts be formed to have a complicated shape or the like in comparison with those of the conventional one.

It has been common that, when an adjustable blade for such a VGS turbocharger is manufactured, a metal material (or a shaped material having a starting form for the adjustable blade) including a blade portion and a shaft portion that are integrally formed is first formed, for example, in accordance with a precision casting method represented by a lost wax casting method, a metal injection molding method or the like, and the shaped material is then suitably subjected to cutting or the like, to thereby finish the blade portion and the shaft portion to have desired shapes and dimensions.

However, in the technique using cutting operations applied to the shaped material, the following problems arise. Since this kind of turbo apparatus is constructed so as to introduce exhaust gas and utilize energy of the exhaust gas, a surface member thereof is naturally exposed to a high-temperature atmosphere of the exhaust gas. Since the exhaust gas contains constituents that can corrode the metal material, a heat resisting stainless steel such as SUS310S having excellent heat, oxidation resistance and the like is also used for the adjustable blade. However, since such a material is generally difficult to cut and therefore requires a lot of time to cut it, there is a problem that a lot of trouble is taken for processing it. In addition, since about ten to fifteen adjustable blades are required in one turbocharger, it is necessary to manufacture 300,000 to 450,000 adjustable blades a month in the case that about 30,000 motor vehicles are actually mass-produced monthly, so that the cutting operation is incapable of coping with this (production of about 500 adjustable blades is a limit in the cutting operation). In view of the foregoing, to mass-produce the adjustable blades, it is necessary to remove the cutting operation from the processing steps as much as possible, and rolling is mainly used for processing the shaft portion.

However, even in the case where the shaft portion of the adjustable blade is processed by rolling, there is a tendency that a shaft elongation (a phenomenon that the shaft portion is elongated in an axial direction), a sharp edge (a sharp portion is formed at a distal end of the shaft portion in a protruding state) and the like which are caused by rolling are increased, for example, when a rolling allowance is large. In some cases, in order to correct them, it is necessary to subject the shaft portion to cutting after rolling. Even in the cutting for correction, a lot of time is required as mentioned above, to thereby cause mass-productivity of the adjustable blade to be reduced. Accordingly, there has been required a manufacturing method which can restrict the shaft elongation caused by rolling as much as possible.

Additionally, recent years have seen tighter regulation of exhaust gas emission into the atmosphere particularly from diesel vehicles from a viewpoint of environmental protection and the like. For a diesel engine which inherently runs at low rotational speeds, mass production of a VGS turbocharger capable of improving the engine efficiency from a low rotational speed region has been strongly desired in order to reduce NOx, particulate matter (PM) and the like.

SUMMARY OF THE INVENTION

In a method of manufacturing an adjustable blade for a VGS turbocharger in a first aspect, the adjustable blade includes a shaft portion serving as a center of rotation and a blade portion for substantially adjusting the flow rate of exhaust gas, the adjustable blade is incorporated in the VGS turbocharger, and the exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, whereby a high output power of the engine is obtained at low rotational speeds. In manufacturing the adjustable blade, the adjustable blade is integrally provided with the blade portion and the shaft portion and a starting material thereof is a metal shaped material as a starting form for the adjustable blade. In forming the shaft portion of the adjustable blade, a shaft portion forming section of the shaped material is rolled to have a desired diametrical thickness.

According to the invention, it is possible to manufacture the adjustable blade for the VGS turbocharger while a cutting operation, a welding operation, or another operation which requires a lot of trouble is used as little as possible. Accordingly, it is possible to reduce a manufacturing cost of the adjustable blade, so that mass-production of the adjustable blade can be actually achieved.

Further, in a method of manufacturing an adjustable blade for a VGS turbocharger as defined in a second aspect, in addition to the features according to the first aspect, in forming the shaped material for the adjustable blade, the shaped material is obtained by a precision casting method, a metal injection molding method, or a technique of shaping a blank punched out from a metal material having a substantially fixed thickness into a desired shape. The shaped material is formed to have a near net shape so that the shape and dimensions thereof are made close to those of the aimed at adjustable blade.

According to the invention, since the shaped material is formed to have a near net shape, it is possible to reduce a rolling allowance to an extremely small level. Accordingly, it is possible to restrict a shaft elongation caused by rolling of the shaft portion, to thereby eliminate a cutting operation which has been frequently performed for correcting the shaft elongation heretofore, with the result that more cutting operation can be eliminated from the manufacturing process of the adjustable blade. Further, the adjustable blade as a final product can be obtained with a high accuracy, resulting in the mass-production of the adjustable blade being more actually achieved.

A method of manufacturing an adjustable blade for a VGS turbocharger according to a third aspect is characterized in that: in addition to the features according to the first or second aspect, the shaft portion of the adjustable blade has a fitting portion rotatably fitted into a receiving hole of a frame member positioned outside an outer periphery of the exhaust gas turbine wheel. The fitting portion includes a part to be rolled and a non-rolled part having a somewhat smaller diameter than that of the part to be rolled, wherein rolling of the shaft portion is carried out by applying roll forming only to the part to be rolled.

According to the invention, since the form rolling is applied only to the part to be rolled of the fitting portion, in the adjustable blade, it is possible to remarkably restrict the shaft elongation caused by the form rolling in comparison with the case in which the entire shaft portion including the fitting portion is rolled, resulting in the adjustable blade being efficiently manufactured.

Further, a method of manufacturing an adjustable blade for a VGS turbocharger according to a fourth aspect is characterized in that: in addition to the features according to the third aspect, the fitting portion of the adjustable blade is provided at opposite ends thereof with the respective parts to be rolled while the non-rolled part is interposed therebetween.

According to the invention, since the parts to be rolled are formed at the opposite sides of the fitting portion in such a manner as to hold the non-rolled part therebetween, the part to be rolled carries out an operation of maintaining a smooth sliding state just inside the opposite ends of the receiving port, after rolling. Accordingly, when the flow rate of the exhaust gas is regulated, the rotation of the adjustable blade is more stable, so that performance of the turbocharger, that is, the flow rate can be reliably controlled.

Further, a method of manufacturing an adjustable blade for a VGS turbocharger according to a fifth aspect is characterized in that: in addition to the features according to the third or fourth aspects, a size of a step between the part to be rolled and the non-rolled part of the fitting portion formed on the shaped material is set to be larger than a rolling allowance of the part to be rolled, so that metal material in a rolling allowance region is partially caused to flow from the part to be rolled to the non-rolled part of the small diameter during rolling.

According to the invention, since the metal material of the part to be rolled is partially caused to flow to the non-rolled side along the step at the time of rolling, it is possible to further restrict the shaft elongation caused by the rolling. That is, it is possible to further restrict the shaft elongation by utilizing the plastic flow of the metal material at the time of rolling.

Further, a method of manufacturing an adjustable blade for a VGS turbocharger according to a sixth aspect is characterized in that: in addition to the features according to aspects one through five, the shaft portion forming section of the shaped material is rolled by using a set of rolling rollers. In selecting the rotational speed of the rolling rollers and a feeding speed at which the set of rolling rollers are moved in close to each other, a working condition is set by comprehensively judging relative merits of a rolling property on the basis of a shaft elongation and a sharp edge generated by the rolling, a strain accumulated in the shaft portion by the rolling or a pressing force required for rolling so as to improve productivity as much as possible while maintaining the rolling property approximately in a desired value.

According to the invention, it is possible to easily set the working condition (the rotational speed and the feeding speed of the rolling rollers) for improving the productivity as much as possible without lowering the rolling property. In other words, though, in general, it is possible to improve the productivity by setting the rotational speed and the feeding speed of the rolling rollers to be high, a precise rolling operation can not always be achieved. On the other hand, it is possible to achieve the precise rolling operation (the rolling property being excellent) by setting the rotational speed and the feeding speed of the rolling roller to be low. However, it is necessarily unavoidable that the productivity is lowered. Accordingly, in the conventional technique, it is extremely difficult to set the working condition so as to establish both of the rolling property and the productivity. However, in accordance with the invention, it is possible to extremely easily set the working condition which can smoothen the surface of the shaft portion as smooth as possible while taking them into consideration.

Further, a method of manufacturing an adjustable blade for a VGS turbocharger according to a seventh aspect is characterized in that: in addition to the features according to the sixth aspect, in selecting the rotational speed and the feeding speed of the rolling rollers, on a graph in which the rotational speed of the rolling rollers and the level of the rolling property are defined as two different axes, the working condition constituted by the rotational speed and the feeding speed of the rolling rollers is set within an area surrounded by a locus showing a relation between the rotational speed of the rolling rollers and the rolling property at the time of setting the feeding speed of the rolling rollers to be a critical minimum value Vmin, a line obtained by setting the rotational speed of the rolling rollers to be a critical maximum value Rmax, and a line obtained by setting a level of the rolling property to be a critical minimum value Pmin.

According to the invention, it is possible to set an actual working condition obtained by taking into consideration the critical minimum value Vmin of the feeding speed of the rolling rollers, the critical maximum value Rmax of the rotational speed of the rolling rollers, and the critical minimum value Pmin of the rolling property.

Further, a method of manufacturing an adjustable blade for a VGS turbocharger according to an eighth aspect is characterized in that: in addition to the features according to the seventh aspect, in selecting the rotational speed and the feeding speed of the rolling rollers, a desired rolling property Pf (Pf>Pmin) is set within the area, and the rotational speed of the rolling rollers and the feeding speed of the rolling rollers are set on a line of the desired rolling property Pf.

According to the invention, it is possible to easily set the working condition in which the desired rolling property Pf is securely kept while taking into consideration the critical minimum value Vmin of the feeding speed of the rolling rollers, the critical maximum value Rmax of the rotational speed of the rolling rollers, and the critical minimum value Pmin of the rolling property.

Further, an adjustable blade for a VGS turbocharger according to a ninth aspect comprises: a shaft portion serving as a center of rotation and a blade portion for substantially adjusting the flow rate of exhaust gas. The exhaust gas discharged from an engine at a relatively low flow rate is suitably throttled to increase the velocity of the exhaust gas so that an exhaust turbine wheel is rotated by energy of the exhaust gas and a compressor directly coupled to the exhaust turbine wheel feeds more air into the engine than is fed into it by natural suction, whereby a high output power of the engine is obtained at low rotational speeds. The adjustable blade is characterized in that: the adjustable blade is manufactured in accordance with the manufacturing method according to the first through eighth aspects.

According to the invention, since the adjustable blade for the VGS turbocharger can be manufactured with using the cutting operation, the welding operation or the like which requires a lot of time for processing as little as possible, it is possible to stably supply the adjustable blades as mass-produced products to the market. In this connection, in accordance with the conventional technique exclusively using cutting operations, only about 500 products can be manufactured a day; whereas in accordance with the rolling technique of the invention, it is possible to mass-produce about 5000 products a day. Further, it is possible to obtain the adjustable blade having a high quality in which the shaft elongation unavoidably caused by the rolling can be restricted as much as possible.

Further, an exhaust gas guide assembly for a VGS turbocharger according to the tenth aspect comprises: adjustable blades for suitably controlling the flow rate of exhaust gas discharged from an engine to rotate an exhaust turbine wheel; a turbine frame which rotatably supports the adjustable blades at the outside of an outer periphery of the turbine wheel; and an adjusting mechanism for suitably rotating the adjustable blades to control the flow rate of the exhaust gas; wherein flow of the exhaust gas at a low flow rate is throttled by the adjustable blades to increase the velocity of the exhaust gas so that a high output power is obtained at low rotational speeds, and the exhaust gas guide assembly is characterized in that: an adjustable blade according to the ninth aspect is applied to each of the adjustable blades.

According to the invention, mass-production of the exhaust gas guide assembly having a high heat resistance and a high accuracy can be actually achieved.

Further, a VGS turbocharger according to an eleventh aspect is so constructed that an exhaust turbine is driven by exhaust energy of an engine to rotate a compressor coupled to the exhaust turbine with the power of the exhaust turbine, whereby the engine is supercharged to have more air fed into it than is fed into it by natural suction, and the VGS turbocharger is characterized in that: the turbocharger has an exhaust gas guide assembly according to the tenth aspect incorporated therein. Thus, flow of the exhaust gas at a relatively low flow rate is throttled to increase the velocity of the exhaust gas so that a high output power is obtained when the engine is running at low rotational speeds.

According to the invention, mass production of the VGS turbocharger having a high heat-resistance can be actually achieved. The turbocharger has highly accurate adjustable blades incorporated therein, to thereby ensure accurate and reliable adjustment of the flow rate of the exhaust gas, allowing the turbocharger to sufficiently withstand use in a high-temperature exhaust gas atmosphere.

BRIEF DESCRIPTION OF THE DRAWINGS

FIG. 8 is a skeleton schematic view showing an operation aspect of a rolling apparatus stepwise in accordance with embodiment 4.

DETAILED DESCRIPTION OF THE INVENTION

Figure 1:
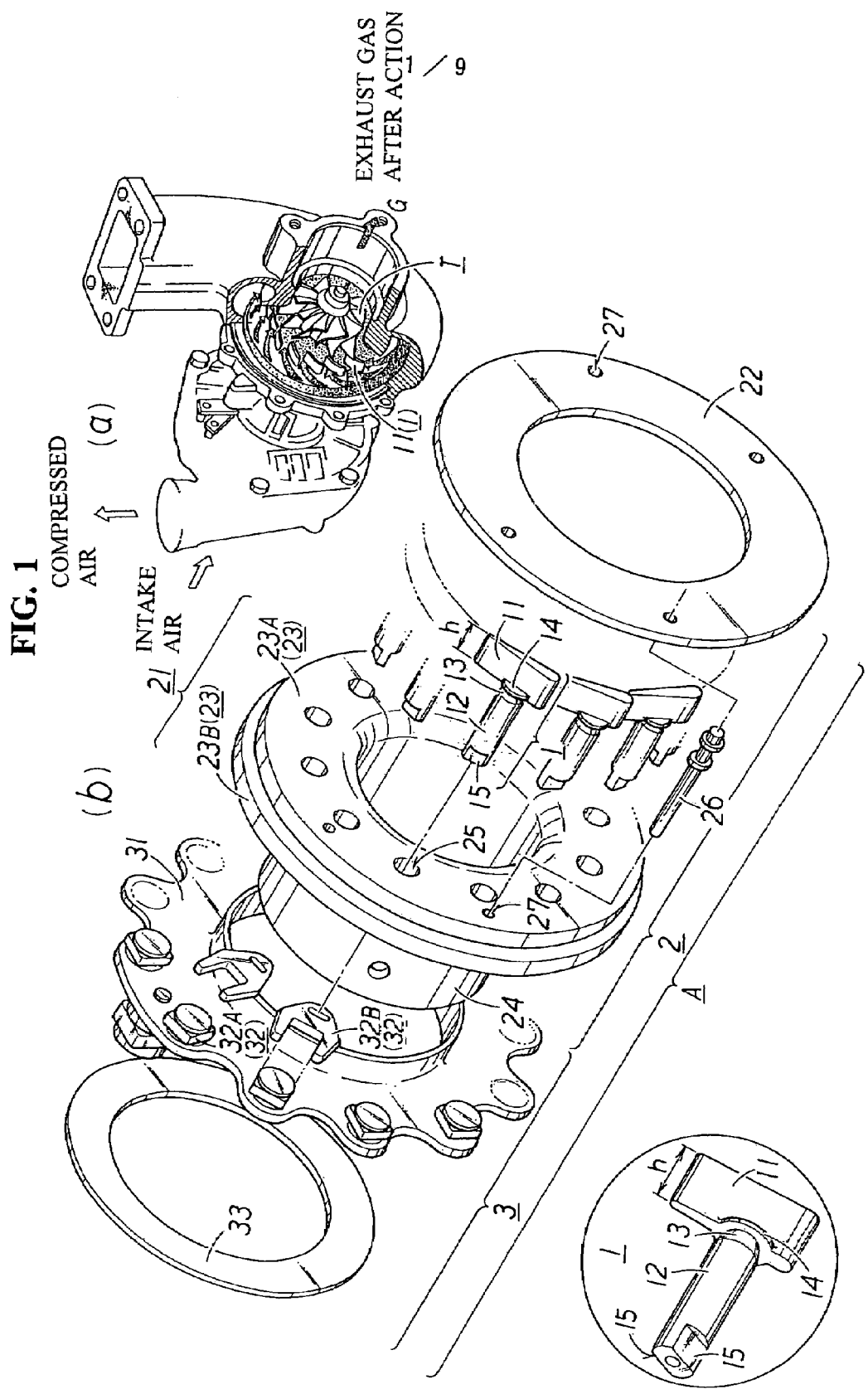
FIG. 1(a) is a perspective view showing an example of a VGS turbocharger having adjustable blades manufactured in accordance with the present invention incorporated therein.
FIG. 1(b) is an exploded perspective view showing an exhaust gas guide assembly.

The present invention will be described hereinbelow with reference to embodiments shown in the drawings. A description will be made of an adjustable blade 1 according to the present invention while a description will be given of an exhaust gas guide assembly A for a VGS turbocharger in which the adjustable blades 1 are used, followed by a description of a method of manufacturing the adjustable blade 1.

The exhaust gas guide assembly A suitably controls the flow rate of exhaust gas G by throttling the exhaust gas G as necessary while an engine is running at low rotational speeds. The exhaust gas guide assembly, as shown in FIG. 1 as an example, comprises a plurality of adjustable blades 1 for setting substantially the flow rate of the exhaust gas, provided at the outside of an outer periphery of an exhaust turbine wheel T, a turbine frame 2 for rotatably supporting the adjustable blades 1 and a blade adjusting mechanism 3 for rotating the adjustable blades 1 by a predetermined angle to set the flow rate of the exhaust gas G as necessary. Each component will be described.

First, the adjustable blade 1 will be described. As shown in FIG. 1 as an example, a plurality of adjustable blades 1 (approximately 10–15 blades for one unit of the exhaust gas guide assembly A) are arranged in an arc along the outer circumference of the exhaust turbine wheel T so that the adjustable blades 1 rotate respectively almost the same angle to suitably control the flow rate of the exhaust gas. Each adjustable blade 1 comprises a blade portion 11 and a shaft portion 12.

The blade portion 11 is formed to have a certain width corresponding mainly to a width of the exhaust turbine wheel T and an airfoil shape in cross-section in a width direction such that the exhaust gas G is effectively directed to the exhaust turbine wheel T. Hereinafter, the width dimension of the blade portion 11 is referred to as "blade height h".

The shaft portion 12 is formed to be continuous to and integrated with the blade portion 11, so that the blade portion 11 serves as a rotation shaft for the blade portion 11 to be moved.

Figure 2:
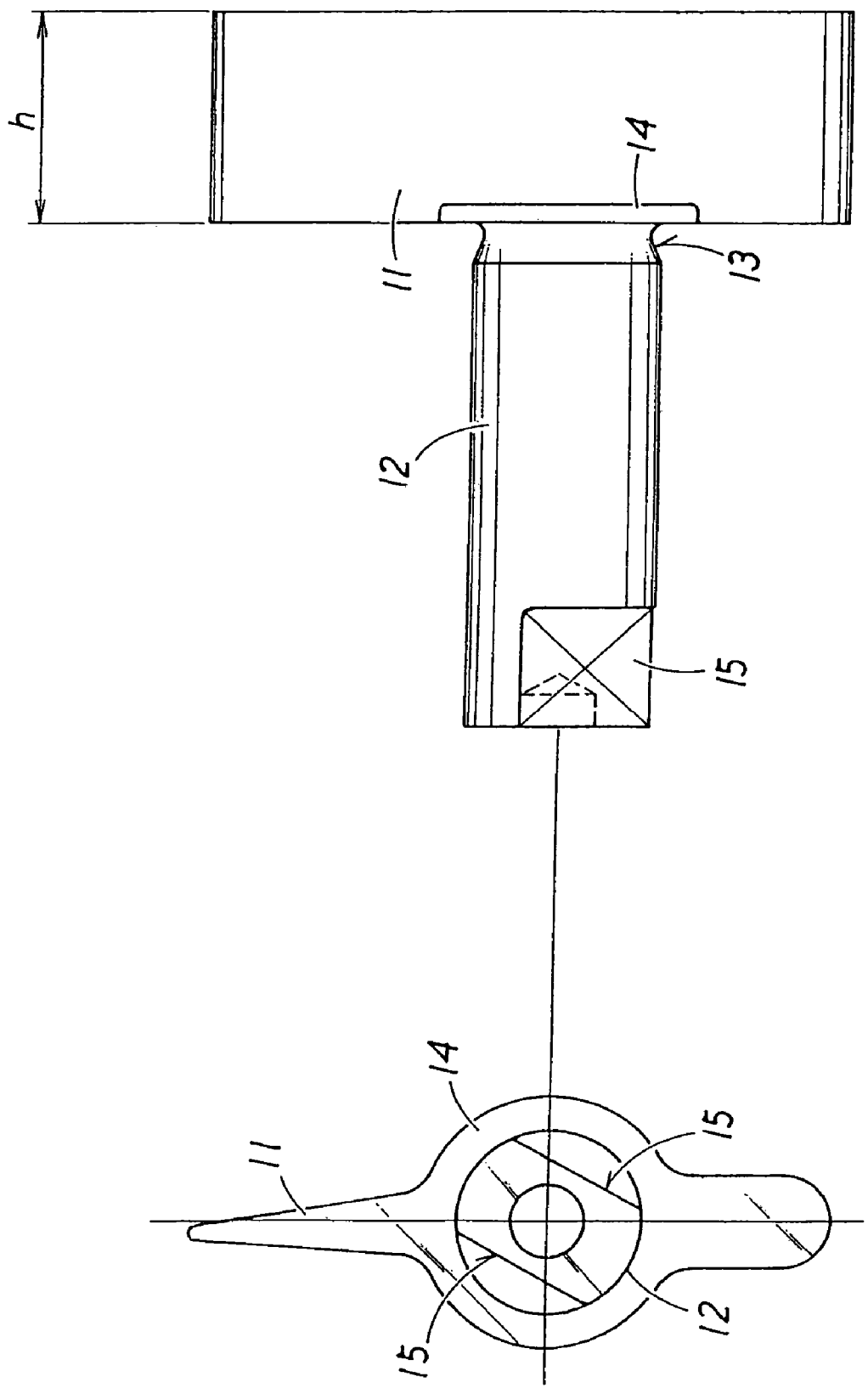
FIG. 2 is a front elevational view and a left side elevational view showing an example of the adjustable blade manufactured in accordance with the present invention.

In a portion connecting the blade portion 11 and the shaft portion 12, a taper portion 13 tapering from the shaft portion 12 to the blade portion 11 and a flange portion 14 having a somewhat larger diameter than that of the shaft portion 12 are formed continuously. A bottom face of the flange portion 14 is formed to be almost flush with an end face of the blade portion 11 on the side of the shaft portion 12 of the adjustable blade 1, to thereby ensure a smooth rotation of the adjustable blade 1 through the bottom face serving as a sliding surface in a state where the adjustable blade 1 is fitted to the turbine frame 2. Furthermore, at a distal end of the shaft portion 12, reference planes 15 serving as a basis for mounting of the adjustable blade 1 is formed. These reference planes 15 are a portion fixed by caulking or the like to the blade adjusting mechanism 3. The reference planes 15, as shown in FIGS. 1 and 2 as an example, are formed by cutting out the shaft portion 12 on its opposite sides in a manner to have a substantially constant inclination with respect to the blade portion 11.

In this case, the adjustable blade 1 of the present invention is obtained as a complete product in such a manner that a metal material (hereinafter, refer to as a shaped material W) integrally provided with the blade portion 11 and the shaft portion 12 in an incomplete state is first formed, and then the shaped material W is subjected to appropriate processing such as rolling or the like, to thereby attain an aimed at shape and dimensional accuracy. In this case, portions of the shaped material W in which the blade portion 11 and the shaft portion 12 are finally formed are defined respectively as a blade portion forming section 11a and a shaft portion forming section 12a.

Next, the turbine frame 2 will be described. The turbine frame 2 is constructed as a frame member for rotatably holding the plurality of adjustable blades 1. The turbine frame 2, as shown in FIG. 1 as an example, is constructed to sandwich the adjustable blades 1 by a frame segment 21 and a holding member 22 thereof. The frame segment 21 comprises a flange portion 23 for receiving the shaft portions 12 of the adjustable blades 1 and a boss portion 24 for being fitted therearound with the blade adjusting mechanism 3 described later. In such construction, the same number of receiving holes 25 as the number of the adjustable blades 1 are formed on a peripheral portion of the flange portion 23 spaced regularly. The holding member 22 is formed to have a disk shape having an opening at the center thereof as shown in FIG. 1. In order to always rotate the blade portions 11 of the adjustable blades 1 sandwiched by the frame segment 21 and the holding member 22 smoothly, the dimension between the frame segment 21 and the holding member 22 is maintained at a substantially constant dimension (approximately the dimension of the blade width of the adjustable blade 1) and, as an example, the dimension is maintained by caulking pins 26 provided at four positions on the radially outer side of the receiving holes 25. Correspondingly, pin insertion holes 27 for receiving the respective caulking pins 26 are formed on the frame segment 21 and holding member 22.

In the illustrated embodiment, the flange portion 23 of the frame segment 21 comprises two flange parts, i.e. a first flange part 23A having almost the same diameter as that of the holding member 22 and a second flange part 23B having a somewhat larger diameter than that of the holding member 22. These flange parts are formed of a single member. However, in the case where it is too complicated to make the flange parts 23A and 23B by processing the same member, the flange parts 23A and 23B may be constructed in such a manner that two flange parts having different diameters are formed separately and then joined to each other by caulking, brazing or the like.

Next, the blade adjusting mechanism 3 will be described. The blade adjusting mechanism 3 is provided on the outer periphery of the boss portion 24 of the turbine frame 2 to rotate the adjustable blades 1 so as to control the flow rate of the exhaust gas. The blade adjusting mechanism 3, as shown in FIG. 1 as an example, comprises a rotating member 31 for substantially causing the rotation of the adjustable blades 1 in the assembly and transmitting members 32 for transmitting the rotation to the adjustable blades 1. As shown in FIG. 1, the rotating member 31 is formed to have an approximate disk shape having an opening at the center thereof and provided on a peripheral portion thereof with the same number of transmitting members 32 as that of the adjustable blades 1 spaced at regular intervals. The transmitting member 32 comprises a driving element 32A rotatably mounted on the rotating member 31 and a driven element 32B fitted fixedly on the reference planes 15 of the adjustable blade 1. In the state where the driving element 32A and the driven element 32B are connected to each other, the rotation is transmitted. More specifically, the driving element 32A having the shape of a rectangular piece is pivotally mounted to the rotating member 31, and the driven element 32B which is formed to be substantially U-shaped to receive the driving element 32A is fixed on the reference planes 15 at the distal end of the adjustable blade 1. The rotating member 31 is attached to the boss portion 24 such that the driving elements 32A having a rectangular shape are fitted into the respective U-shaped driven elements 32B, to thereby engage the driving elements 32A and the driven elements 32B with each other.

In the initial state where the plurality of adjustable blades 1 are attached, in order to align them on the circumference, it is necessary that each of the adjustable blades 1 and a respective one of the driven elements 32 B are attached to form a predetermined angle. In the illustrated embodiment, the reference planes 15 of the adjustable blade 1 mainly perform such an alignment function. Furthermore, in the case where the rotating member 31 is simply fitted into the boss portion 24, it is feared that the engagement of the transmitting member 32 is released when the rotating member 31 slightly moves away from the turbine frame 2. Therefore, in order to prevent this, a ring 33 or the like is provided on the side opposite to the turbine frame 2 such that the rotating member 31 is interposed between the ring 33 and the turbine frame 2, to thereby urge the rotating member 31 toward the turbine frame 2.

By such a structure, when the engine is running at low rotational speeds, the rotating member 31 of the blade adjusting mechanism 3 is rotated as necessary, and the rotation is transmitted to the shaft portions 12 through the transmitting members 32, so that the adjustable blades 1 are rotated as shown in FIG. 1 so as to suitably throttle the exhaust gas G, with the result that the flow rate of the exhaust gas is regulated.

One example of the exhaust gas guide assembly A to which the adjustable blades 1 of the present invention are applied is constructed as mentioned above, and a description will be given below of a method of manufacturing the adjustable blade 1. In the present invention, in order to eliminate as much as possible cutting operations requiring a lot of time, rolling is applied to the shaft portion forming section 12a of the shaped material W so as to have an aimed at (desired) diametrical thickness. It is matter of course that in the case where the shaft portion 12 is merely rolled, a shaft elongation (a phenomenon that the shaft portion 12 is elongated in an axial direction) and a sharp edge (a sharp portion that is formed at the distal end of the shaft portion 12 in a protruding state) are excessively caused by the rolling, resulting in a further cutting operation being required for correcting them. Accordingly, in accordance with the present invention, each of embodiments described below is constructed so as to restrict the shaft elongation, the sharp edge and the like mentioned above as much as possible and eliminate the cutting operation for correction.

In describing the manufacturing method, a description will be given on the basis of the following aspects, namely an aspect in which the shaped material W is formed by a precision casting method is referred to as embodiment 1, and an aspect in which the shaped material W is formed by metal injection molding is referred to as embodiment 2. Further, the description will be also given based on further aspects, namely an aspect that the shaft portion 12 is constituted by a part to be rolled and a non-rolled part and form rolling is applied only to the part to be rolled is referred to as embodiment 3, and an aspect that a rotational speed of the rolling rollers and a feeding speed for moving a pair of rolling rollers in close to each other are reasonably determined is referred to as embodiment 4.

(1) Embodiment 1

(i) Preparing Step of Shaped Material (Casting Step)

This step is a step of preparing the metal shaped material W which is integrally provided with the blade portion forming section 11a and the shaft portion forming section 12a, and which is a starting form for the adjustable blade 1. In this embodiment, a precision casting method represented by lost wax casting is used. The shaped material W casted in this step is formed to have a so-called near net shape which has a shape and a size approximately close to those in a completed state while the shaped material is formed to be somewhat larger than the adjustable blade 1 in a completed state. In this case, it is generally known that a comparatively complicated shape can be faithfully reproduced by the lost wax method per se. However, in this embodiment, an engineering improvement is also added to enhance the fluidity of a molten metal material to be poured at the time of casting so as to make the shape and the size precision of the shaped material W closer to the adjustable blade 1 in the completed state (to increase a near net rate).

In particular, a virgin material is applied to the raw material to be casted (for example, a heat resisting raw material such as SUS310S or the like), amounts of C (carbon), Si (silicone), and O (oxygen) contained in the virgin material are regulated to be 0.05 to 0.5%, 0.5 to 1.5%, and 0.01 to 0.1%, respectively (an added amount in each of the components is expressed by weight %). In this case, the assignee of the present invention has confirmed that a viscous flowability of Stokes flow is improved by at least about 20 to 40% by adjusting the amounts of C, Si and O as mentioned above.

Further, it is designed to shorten a time until a mold is broken by rapidly cooling either one or both of the mold and the shaped material W at the time of casting so as to make a solidification structure of the shaped material W fine-grained. More specifically, water is sprayed on the mold, for example, before and after casting so as to cool the mold, so that the time required until the mold is broken is shortened, for example, to an hour or less (one to four hours are required by a normal air cooling). In this case, only the mold is cooled in the pre-cooling before casting, and both of the mold and the shaped material are cooled in the cooling after casting. Of course, rapid cooling is carried out within the extent that the mold does not have any cracks caused by thermal stress. When cooling is not necessary both before and after the casting, only one of them may be applied and, when the cooling effect is desired to be improved more, it is possible to spray cooling water to the shaped material taken out from the mold in addition to the cooling both before and after casting. Since the solidification structure of the shaped material W is thus made fine-grained to the utmost as mentioned above, it is possible to restrict the sharp edge which can be generated at the time of the later rolling process as much as possible, and it is possible to easily perform the rolling process or the like.

(ii) Rolling Step

Figure 3:
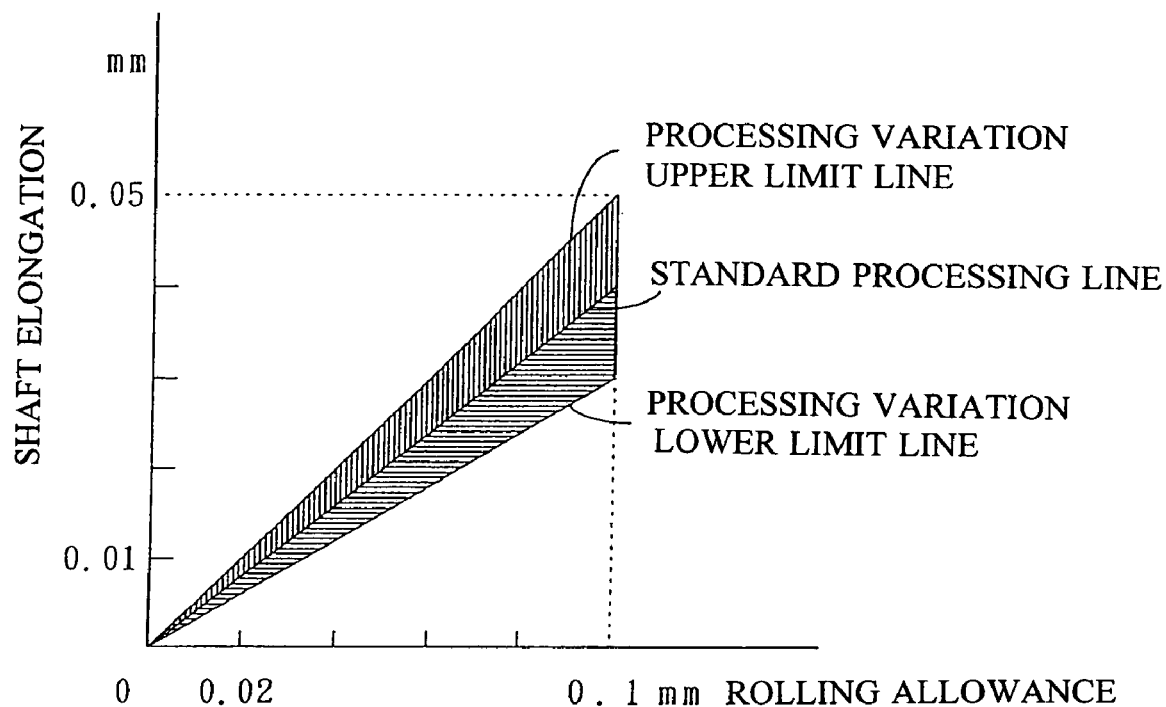
FIG. 3 is a graph showing the relationship between a rolling allowance at the time of rolling a shaft portion of the adjustable blade and a shaft elongation caused thereby in embodiments 1 and 2.

This step is a step of pressing the shaft portion forming section 12a of the casted shaped material W against a pair of dies so as to form into a desired diametrical thickness. In this case, the rolling allowance in this embodiment is limited to about 0.05 to 0.1 mm, for example, whereby the shaft elongation caused by rolling can be restricted to, for example, 0.05 mm or less (an upper limit taking into consideration variations due to processing). The shaft elongation of such a level does not require a substantial post-processing for correcting the shaft elongation, thereby eliminating the cutting operation which has been frequently performed for correcting the shaft elongation conventionally. In this case, the relationship between the rolling allowance and the shaft elongation is shown in FIG. 3. In FIG. 3, a straight line passing through a point at which the shaft elongation is 0.05 mm when the rolling allowance is 0.1 mm is a variation upper limit line, and a range of variations is indicated below the upper limit line by a hatched area including a standard processing line, and is shown (in FIG. 3, upper and lower variation ranges on the basis of the standard processing line are shown by differently hatched).

The rolling allowance of the shaft portion forming section 12a after casting is restricted to the size mentioned above on the grounds, of course, that the shaped material W is cast by the lost wax method, and that the shaped material W is obtained in a state closer to the actual product size due to the enhanced fluidity of the molten metal of the casting raw material caused by the engineering improvement. On the contrary, for all that the shaped material W far away from the actual product size is rolled, the shaft elongation is increased in accordance with an increase of the rolling allowance. In some cases, a new cutting operation is required for correcting the shaft elongation, so that the original purpose of employing the form rolling can not be accomplished.

(iii) Grinding of End Surface of Blade Portion (Grinding of Blade Height)

The blade portion 11 is a portion which is smoothly rotated while being interposed between the frame segment 21 and the holding member 22 in a mounted state, as mentioned in the description of the exhaust gas guide assembly A. Accordingly, in this step, the blade height h is finished with a desired size accuracy by grinding both end surfaces consisting of the end surface of the blade portion 11 close to the frame segment 21 (close to the shaft portion 12) and the end surface opposite thereto close to the holding member 22. Of course, in the case that it is possible to grind either one of both end surfaces of the blade portion 11 in view of the function of the adjustable blade 1, only one end surface may be ground.

(iv) Barreling Step

This step is a step of entirely polishing the surface of the shaped material W which has the desired blade height h and which has both end surfaces of the blade portion 11 thereof ground. The surface of the shaped material W is finished, for example, by rotating or vibrating a barrel having the shaped material W and an additive referred to as media charged therein so as to cause the shaped material W to collide with the media, with the result that the adjustable blade 1 as the finished product is obtained.

(2) Embodiment 2

(i) Preparing Step of Shaped Material (Metal Injection Molding Step)

This step is a step of preparing the shaped material W which is a starting form for the adjustable blade 1 in a manner similar to that in embodiment 1. In this embodiment, a metal injection molding method is employed to obtain the shaped material having a near net shape. The metal injection molding method is substantially the same as a common injection molding method of synthetic resin (plastics) conventionally known. For example, metal powder (material) such as, iron, titanium and the like and a binder (an additive for coupling mainly metal powder particles such as, a mixture of polyethylene resin, wax and phthalic acid ester) are kneaded so as to impart plasticity to the metal powder. Then, the material is injected into a mold and solidified into a desired shape. Thereafter, the binder is removed, and then a shaped material having a desired shape is obtained by sintering.

However, there are problems that the shaped material W formed by the metal injection molding method has a higher porosity as compared to that of solid materials, and that especially, in heat resisting high-alloy materials, the bulk density is not sufficient and high-temperature bending fatigue property is not satisfactory. The porosity represents a kind of cavities (a cluster of a large number of voids, these clusters being further coupled with each other to result in formation of micro-cracks in the crystalline in a metal material or the like). The metal material is adversely effected when the porosity becomes too high. In view of these facts, in this embodiment, in order to generate closed cells (spheroidal spaces between metal particles) as fine and uniformly as possible, sintering is carried out taking a long period of time. More specifically, for example, when SUS310S having the melting point of 1500° C. is used, sintering is carried out at 1300° C. taking a relatively long period of time of approximately two hours.

(ii) HIP Step

By carrying out sintering as described above, the porosity of the shaped material W is decreased, so that the bulk density can be increased. The shaped material W injection-molded is further subjected to hot isostatic pressing in a HIP (Hot Isostatic Pressing) step, whereby the bulk density is further enhanced. More specifically, a pressure of approximately 100 MPa (1000 atmospheres) is applied isotropically to the shaped material W while the shaped material W is heated, for example, at 1300° C.

It has been confirmed that, by carrying out the above sintering and the HIP process, the size of the closed cells that was approximately 100 μm before sintering became approximately 10 μm after sintering and the bulk density was increased by approximately 5%. Due to the bulk density thus increased, improvement of the strength of the shaped material W can be achieved and the dimensional accuracy can be improved, so that a shaped material W having a higher near-net rate can be obtained.

In this embodiment, a technical measurement which makes the metal powder for injection molding sphere-shaped and fine and improves fatigue characteristics of the shaped material W formed under high-temperature rotatory bending is concurrently applied. In making the metal powder sphere-shaped and fine, a so-called air atomizing process or water atomizing process is applied, in which, for example, the molten metal is blown out from a nozzle, and a high-speed fluid such as air or water is applied to the molten metal such that the metal is divided into a large number of liquid drops by the impact of the high-speed fluid. Thereafter, the metal is cooled and solidified, whereby the metal powder is obtained. In such an atomizing process, metal powder having metal particles of a desired size can be obtained by changing as necessary the shape and the diameter of the nozzle for blowing out the molten metal, the discharge velocity of the air or water applied to the molten metal, the cooling rate or the like. It has been confirmed by the assignee that, when metal powder of SUS310S was made to have fine particles such as approximately 200 μm in size and sintered, the fatigue property under high-temperature rotatory bending was improved by approximately 20%.

(iii) Rolling Step

This step is a step of pressing the shaft portion 12 of the shaped material W after the HIP step against a pair of dies so as to form the shaft portion into a desired diametrical thickness. In this case, the rolling allowance in this embodiment is also limited to an extremely small size about 0.05 to 0.1 mm, for example, in the same manner as embodiment 1, whereby it is possible to restrict the shaft elongation caused by rolling, for example, to 0.05 mm or less (an upper limit taking into consideration variations due to processing). Of course, the shaft elongation of such a level does not require a substantial post-processing for correcting the shaft elongation, to thereby eliminate the cutting operation which has been frequently performed for correcting the shaft elongation conventionally (see FIG. 3).

The rolling allowance of the shaft portion forming section 12*a* is restricted to the size mentioned above on the grounds that the shaped material W is obtained by the metal injection method, and that the shaped material W is formed to have a very near net shape due to the enhanced bulk density of the shaped material W caused by the engineering improvement. On the contrary, for all that the shaped material W far away from the actual product size is rolled, the shaft elongation is increased in accordance with an increase of the rolling allowance. In some cases, and a new cutting operation is required for correcting the shaft elongation. Therefore, the original purpose of employing the form rolling can not be accomplished.

Thereafter, the shaped material W is formed into the adjustable blade 1 as a finished product via the steps of grinding the end surfaces of the blade portion (blade height grinding) and barreling. However, since these steps are substantially the same as those of the embodiment 1, the description thereof will be omitted.

(3) Embodiment 3

Figure 4:
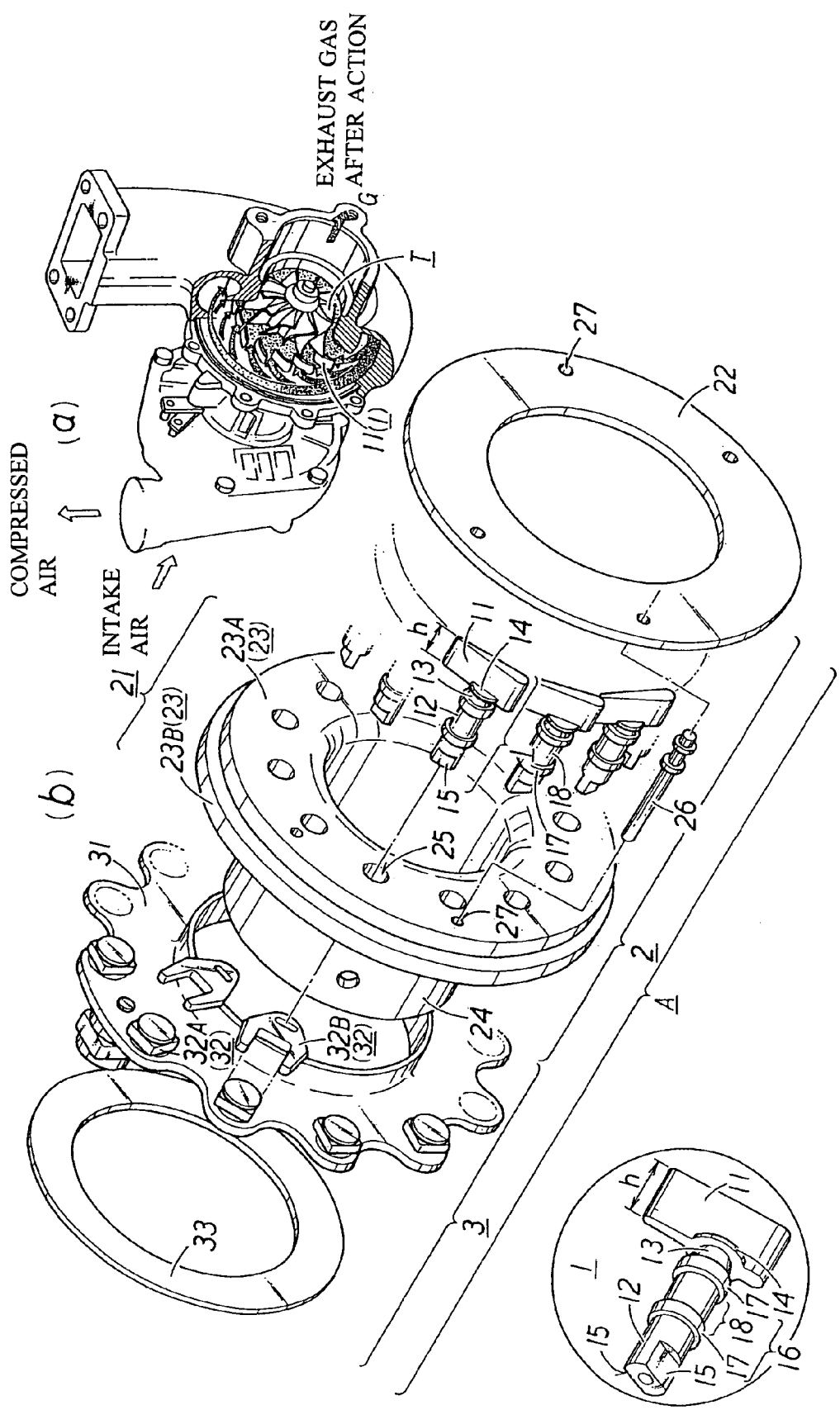
FIG. 4(a) is a perspective view showing an example of a VGS turbocharger having adjustable blades in accordance with embodiment 3 provided with a part to be rolled and a non-rolled part incorporated therein.
FIG. 4(b) is an exploded perspective view showing an exhaust gas guide assembly.

Embodiment 3 is an embodiment in which the structure of the shaft portion 12 per se restricts the shaft elongation or the like unavoidably caused by rolling. More specifically, in this embodiment, in place of applying rolling to the whole of the shaft portion 12, a fitting portion 16 fitted in the turbine frame 2 (the frame member of the exhaust gas turbine T) is partly rolled, for example, as shown in FIG. 4.

Figure 5:
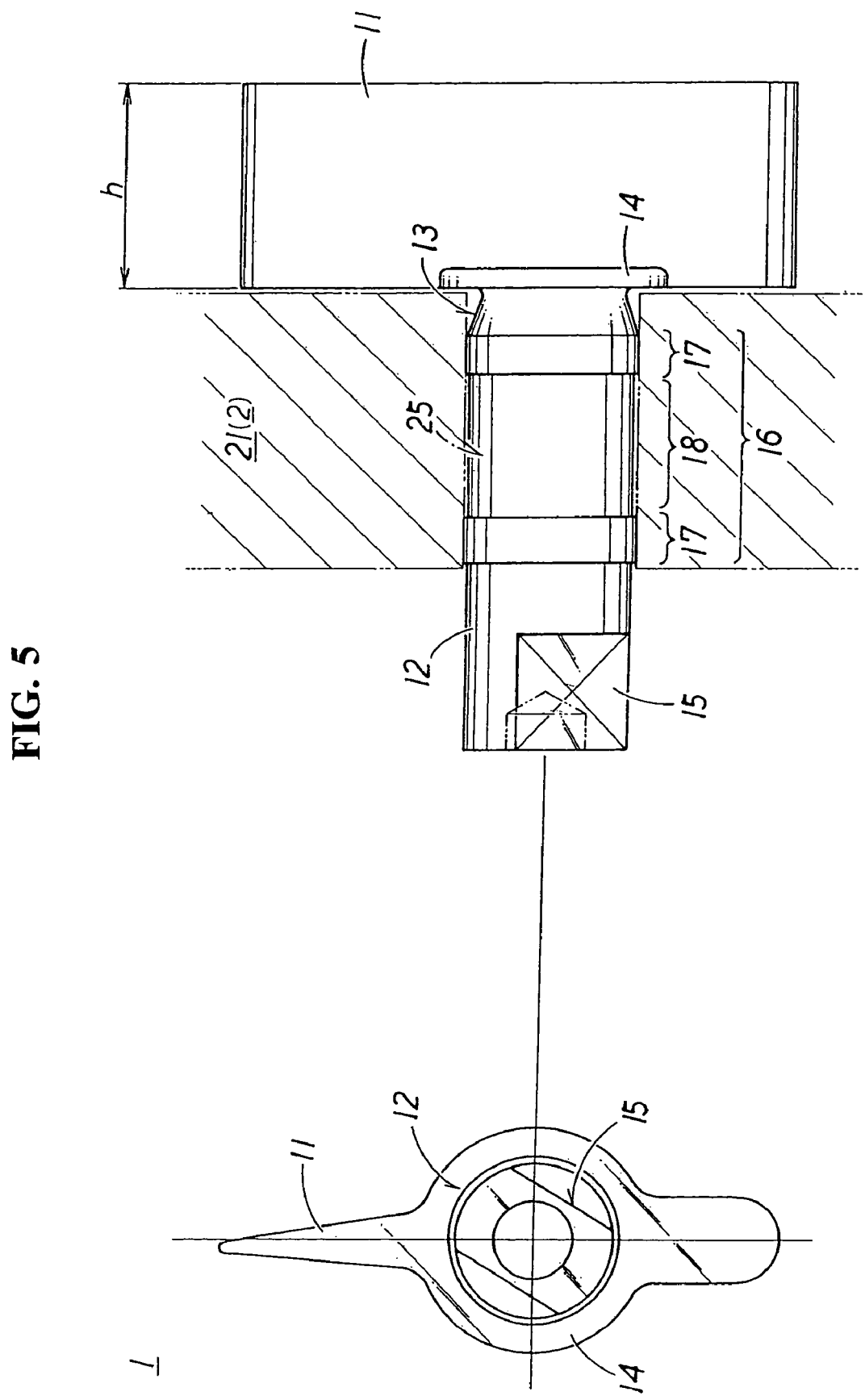
FIG. 5 is a front elevational view and a left side elevational view showing the adjustable blade of the embodiment 3.

A description will be first given of the fitting portion 16. The fitting portion 16 is constructed, for example, as shown in FIG. 5, in such a manner that portions to be rolled 17 to which form rolling is applied are formed near both ends of the fitting portion 16 and a non-rolled part 18 is interposedly formed between the portions to be rolled 17. Further, in this embodiment, in connection with applying the form rolling only to the portions to be rolled 17, the portion to be rolled 17 particularly in the shaped material W is formed to be somewhat thicker than the non-rolled part 18, and for example, a step between the part to be rolled 17 and the non-rolled part 18 is set to be about 0.1 mm. In this case, since the portions to be rolled 17 are positioned near the opposite ends of the fitting portion 16, the adjustable blade 1 is held near the opposite ends of the fitting portion 16, thereby making the rotation of the adjustable blade 1 more stable.

(i) Preparing Step of Shaped Material

This step is a step of preparing the shaped material W which is a starting form for the adjustable blade 1 in a manner similar to that in embodiments 1 and 2 described above. In this embodiment, since in order to roll the shaped material W into the adjustable blade 1, rolling is applied not to the entire of the shaft portion 12 but only to the parts to be rolled 17, the shaped material W is provided with a step portion (for example, of about 0.1 mm) between the part to be rolled 17 and the non-rolled part 18 in the preparing step so as to make the parts to be rolled 17 protrude. Further, for preparing the shaped material W mentioned above, a method of blanking or punching out a blank in addition to the precision casting method and the metal injection molding method mentioned above may be employed. In this case, descriptions of the precision casting method and the metal injection molding method are omitted, and a description will be given only of a method of punching out the blank so as to obtain the shaped material W.

(a) Blanking a Blank

This technique is a technique in which a blank is blanked or punched out from a band steel or the like having a substantially constant thickness, for example, about 4 mm in such a manner as to have a volume (a volume of the metal material) capable of achieving the aimed at adjustable blade 1 and which serves as a starting material (a shaped material W). Of course, in the blanking process, since a punching direction is straight, it is impossible to form, for example, the shaft portion forming section 12*a* to have an approximately circular shape in cross section only by the blanking step, and thus the blanked blank is generally formed to have an approximately rectangular shape in cross section. Accordingly, before the processing progresses to the rolling step after the punching step, the shaft portion forming section 12*a* is formed to have an approximately circular cross section by applying a forming process such as forging, coining or the like to the shaft portion forming section 12*a* having, for example, an approximately rectangular cross section. In other words, substantially, the shaped material W having a near net shape of the same level as that by precision casting, metal injection molding or the like, is obtained through the blanking step and the forming step.

In the case of changing the cross sectional shape in the forming step, a technical design of rounding (fillet processing) or chamfering corners of the shaft portion forming section 12*a* or the like of the blanked blank (the shaped material W) so as to make the shape thereof close to a completed shape such as a circular shape or the like. Accordingly, it is possible to prevent a dead metal flow state of the metal material, so that a smooth plastic flow of the metal material can be promoted in the substantial forming step. In this connection, in the forming step, the blade portion 11 can be concurrently formed to have a desired shape.

(ii) Rolling Step of Shaft Portion

After forming the shaped material W having a near net shape by the method mentioned above, the shaft portion forming section 12*a* of the shaped material W is processed to have a desired diametrical thickness by rolling. At this time, the part to be rolled 17 formed in a protruding state rather than the non-rolled part 18 is substantially rolled by pressing the part to be rolled 17 with a pair of dies (rolling rollers) D while the shaped material W and the dies D are relatively rotated.

Figure 6:
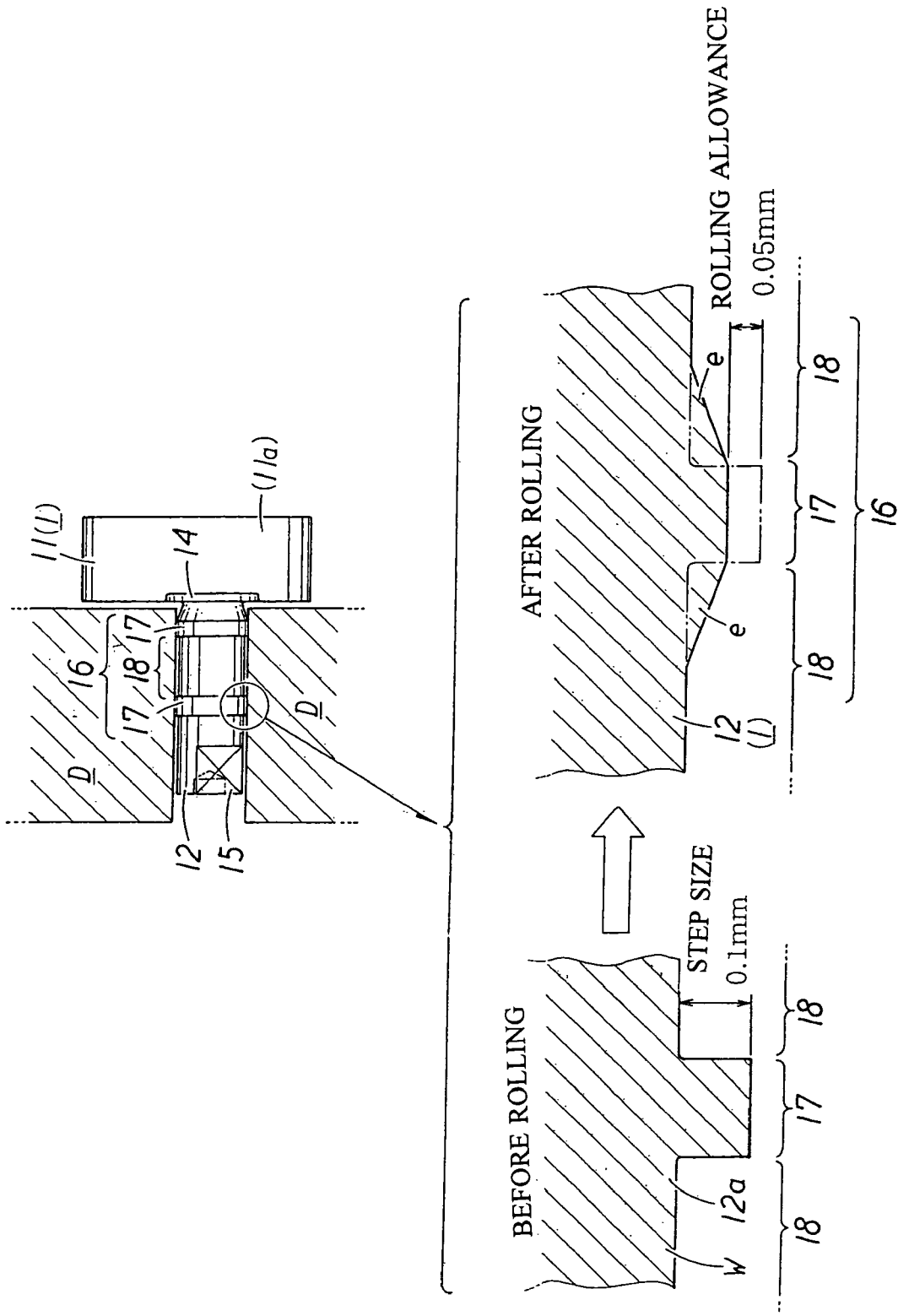
FIG. 6 is a schematic view comparatively showing a shaft portion of the adjustable blade of the embodiment 3 before being rolled and after being rolled.

In this case, as also shown in FIG. 6, in the case that the step between the part to be rolled 17 and the non-rolled part 18 is about 0.1 mm, the rolling allowance of the part to be rolled 17 in the present step is set, for example, to be 0.05 mm or less. Accordingly, the step (of about 0.05 mm) obtained by subtracting the rolling allowance from the initial step size remains between the part to be rolled 17 and the non-rolled part 18 even after the rolling. The metal material positioned on the surface of the part to be rolled 17 flows so as to be guided to the non-rolled part 18 due to the step, to thereby further restrict the shaft elongation caused by rolling.

Figure 7:
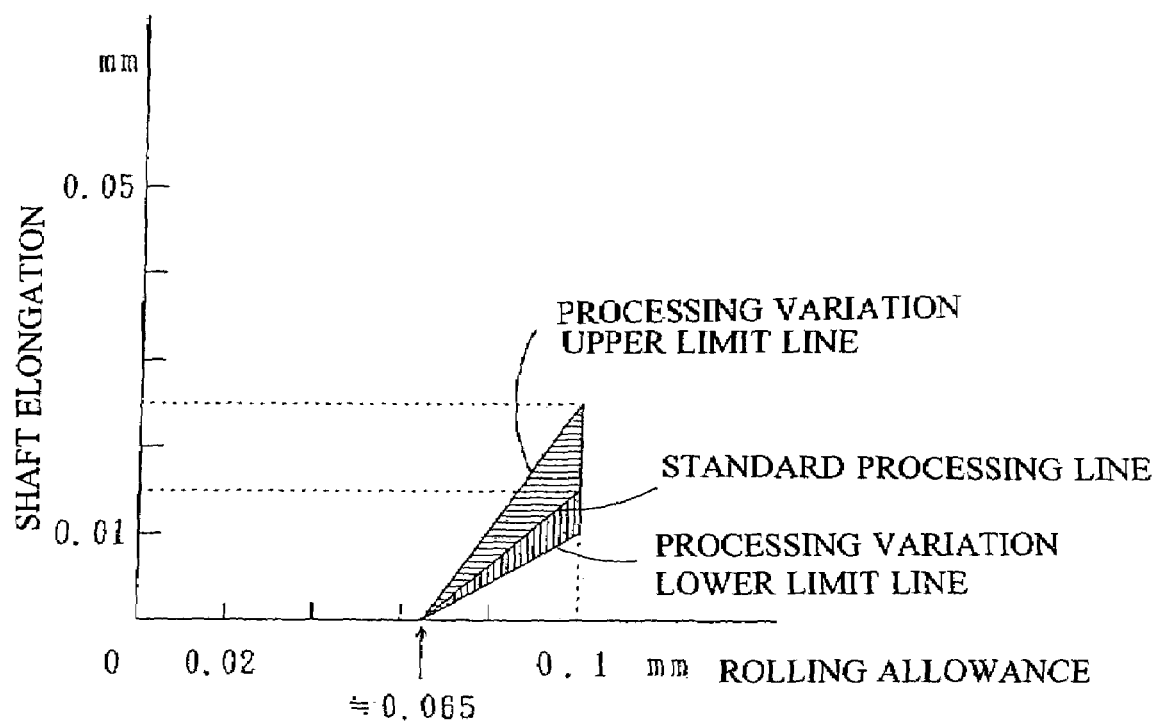
FIG. 7 is a graph showing the relationship between a rolling allowance of the part to be rolled and a shaft elongation caused in the adjustable blade of the embodiment 3.

In this case, the relationship between the rolling allowance of the part to be rolled 17 and the shaft elongation is shown in FIG. 7 by way of example. As can be seen in FIG. 7, when the rolling allowance is approximately equal to or less than 0.065 mm, the substantial shaft elongation is 0 stably, so that the shaft elongation is hardly generated. Therefore, in this embodiment, the rolling allowance is set to be equal to or less than 0.05 mm, taking some additional margin into consideration. In this case, in FIG. 7, a straight line passing through a point where the shaft elongation is about 0.015 mm when the rolling allowance is 0.1 mm, forms approximately a reference of relationship between the rolling allowance and the shaft elongation, and a range of variations is indicated by upper and lower hatched areas on the basis of the reference line. In this case, the relationship (the reference line) between the rolling allowance and the shaft elongation shown in FIG. 7 does not pass through an origin. This is because the metal material of the part to be rolled 17 flows so as to be mainly displaced to the non-rolled part 18 in rolling as mentioned above, and the substantial shaft elongation is restricted to 0 within a certain rolling allowance (approximately 0.065 mm on the graph).

Application of form rolling only to the part to be rolled 17 can significantly reduce the shaft elongation to approximately 0 in a stable state, in comparison with the case of rolling the entire of the fitting portion 16 or the shaft portion 12. Accordingly, it is possible to eliminate the cutting operation which has been conventionally performed for correcting the shaft elongation after the rolling, so that the cutting operation requiring a lot of time can be approximately completely eliminated from the processing step of the adjustable blade 1, resulting in mass production of the adjustable blade 1 being more actually achieved.

Further, the metal material flowing toward the non-rolled part 18 from the part to be rolled 17 is microscopically formed into a taper portion as if the metal material overlaps the part to be rolled 17 and the non-rolled part 18, as shown in FIG. 6, and the metal material in this part is particularly denoted as an excess metal portion by reference character e. Further, the excess metal portion e which flowed from the part to be rolled 17 to the non-rolled part 18 and which is formed so as to connect both the parts does not become thicker than the part to be rolled 17 due to the manner of formation thereof. Accordingly, when the adjustable blade 1 rotates, the excess metal portion e does not prevent the rotation. Further, in this embodiment, since the parts to be rolled 17 are formed near the opposite ends of the fitting portion 16 so as to hold the non-rolled part 18 therebetween, the parts to be rolled 17 hold the adjustable blade 1 just inside the ends of the receiving hole 25 formed in the frame segment 21, to thereby reliably and stably rotate the adjustable blade 1.

Thereafter, the shaped material W is formed into the adjustable blade 1 as a finished product via the grinding step of the end surfaces of the blade portion (blade height grinding) and the barreling step. Since these steps are substantially the same as those of the embodiment 1, a description thereof will be omitted.

(4) Embodiment 4

Embodiment 4 is an embodiment showing a rational decision method which employs a rotational speed of the rolling rollers and a feeding speed at which the rolling rollers in pair are moved in close to each other as a working condition at the time of rolling the shaft portion 12, wherein the condition is set to improve productivity as much as possible while the restriction of the shaft elongation or the like is taken into consideration.

Further, in this embodiment, the shaped material W to which rolling is applied is formed to have a near net shape of the adjustable blade 1 as a product. An appropriate method such as precision casting, metal injection molding, blanking of a blank or the like mentioned above can be used to obtain the shaped material W. In this case, in the following description, the preparing step of the shaped material is omitted, and a description will be mainly given of rolling of the shaft portion.

(i) Rolling of Shaft Portion (a) Description of Rolling Apparatus

A description will be first given of an example of a rolling apparatus 6. The rolling apparatus 6 is so constructed, for example, as shown in FIG. 8 that a workpiece (a shaped material W) is interposed between a pair of rolling rollers 61 (dies), and rolling is performed while the rolling rollers 61 and the shaped material W are relatively rotated. Further, in this embodiment, the rolling rollers 61 are arranged such that one is disposed at a fixed position and the other freely moves in close to and apart from the roller at the fixed position. Further, in this case, the roller at the fixed position is set to freely rotate, and only the freely approaching and departing roller is rotationally driven. In this case, in the pair of rolling rollers 61, the rolling roller set at the fixed position is referred to as a free rotating roller 61A, and the rolling roller set in the freely approaching and departing state is referred to as a movable roller 61B as distinguished from each other by reference symbols.

At the time of form rolling, a rotation of the movable roller 61B is transmitted to the free rotating roller 61A via the interposed shaped material W, and both of the rolling rollers 61 rotate substantially at the same rotational speed. Further, the pair of rolling rollers 61 before performing rolling stand ready apart from each other at a sufficient distance, for example, as shown in FIG. 8(a). After the shaped material W is placed near the free rotating roller 61A in a non-rotating state (see FIG. 8(b)), the movable roller 61B is moved in close to the free rotating roller 61A step by step while the movable roller 61B is rotated, to thereby perform rolling (see FIGS. 8(b) to 8(d)). In this case, the approaching of the pair of rolling rollers 61, that is, the approaching of the movable roller 61B to the free rotating roller 61A is referred to as "feeding". In this case, for holding the shaped material W between the pair of rolling rollers 61 during the rolling process, a supporting jig may be used as occasion demands.

(b) Working Condition and Rolling Property

In connection with the matter that the shaft portion forming section 12a of the shaped material W is rolled in the manner mentioned above, there are listed, for example, a rotational speed R of the rolling rollers 61 and a feeding speed V of the rolling rollers, as a working condition at the time of rolling. There is listed a rolling property P obtained by generally taking into consideration various elements such as the shaft elongation, the sharp edge, a pressure rolling force (a pressing force which the rolling rollers 61 apply to the shaped material W at the time of processing), an accumulated strain (a strain accumulated in the shaft portion 12 due to the form rolling) and the like, in order to totally estimate a rolled state of the shaft portion 12, the performance of the rolling process per se, and the like, with respect to the working condition mentioned above. Accordingly, for example, "a state in which the rolling property is very excellent" (corresponding to a topmost position in a vertical axis shown in FIG. 9) means a state in which the shaft elongation, the sharp edge and the like are hardly generated in the shaft portion 12 after being processed, the pressure rolling force required for the rolling is small, the surface of the shaft portion 12 is extremely smooth, and the accumulated strain in the shaft portion 12 is extremely small.

In this case, in general, if the rolling rollers 61 are rotated at a high rotational speed and fed at a high speed (both of the rotational speed R and the feeding speed V are set in high states), it is possible to shorten a time for rolling one adjustable blade 1, to thereby process a lot of adjustable blades. However, in the case of merely setting the above, the rolling property P is lowered. In other words, in general, if the rolling rollers 61 are set in the high rotation and high speed feeding state, a lot of adjustable blades 1 can be processed (it is possible to improve a productivity) while the rolling property P is lowered, so that for example, the shaft elongation, the sharp edge or the like tends to be generated. On the contrary, in general, if the rolling rollers 61 are in the low rotation and low speed feeding state, it is difficult to roll a lot of adjustable blades 1 while it is possible to improve the rolling property P and it is possible to perform rolling with a high accuracy. This embodiment is intended to improve mass productivity as much as possible while a desired rolling property is maintained, taking both the rolling property and the mass productivity into consideration. A description will be given below of a method of setting the working condition on the basis of a graph shown in FIG. 9.

(c) As to Graph

Figure 9:
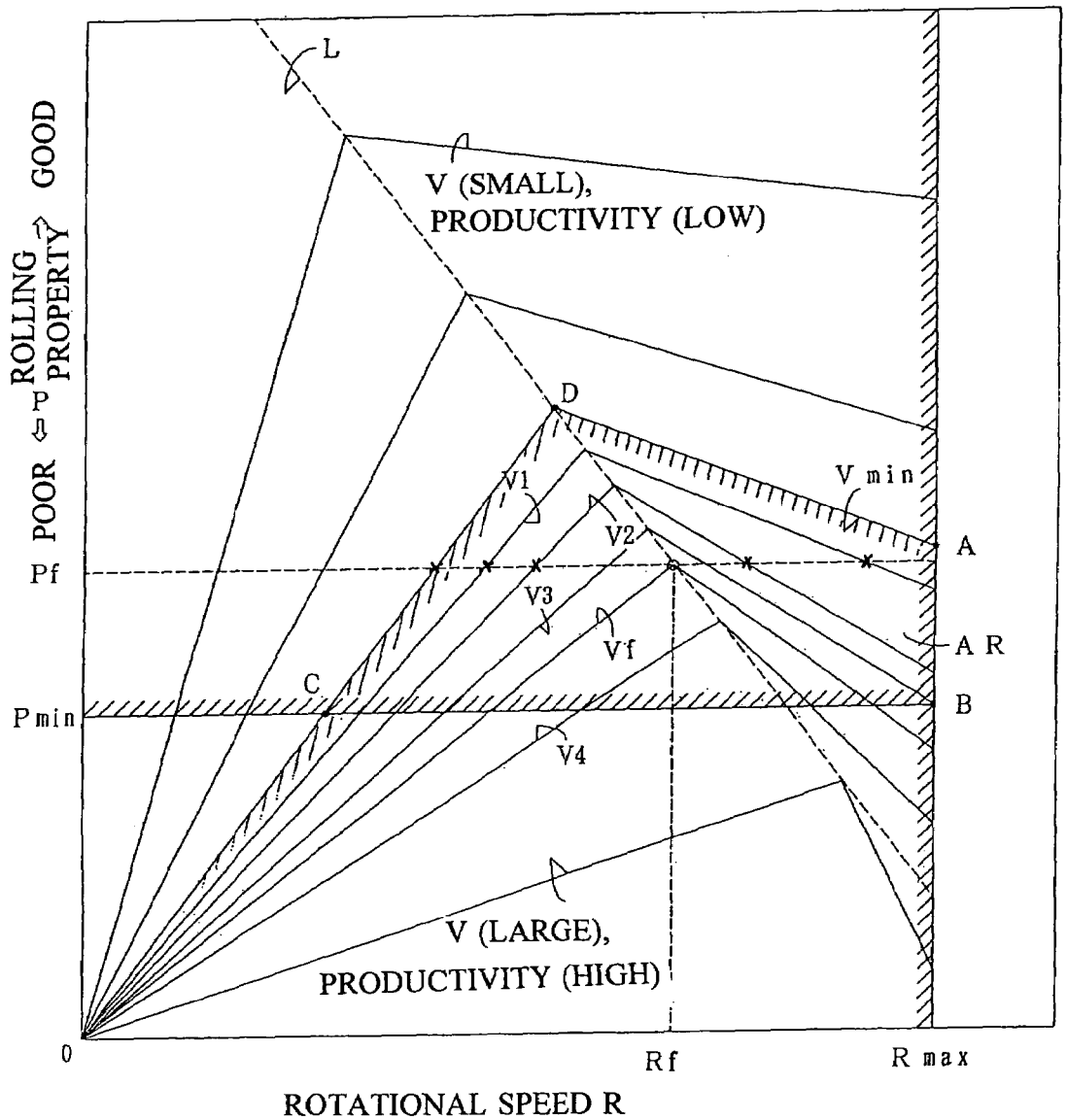
FIG. 9 is a graph showing a correlation among a rolling property, a rotational speed of rolling rollers and a feeding speed of the rolling rollers at the time of rolling a shaft portion of an adjustable blade in the embodiment 4.

A horizontal axis of a graph in FIG. 9 shows the rotational speed R (for example, a rotational speed per a unit time) of the rolling rollers 61, and a vertical axis shows a degree of the relative merit of the rolling property P. In this case, "Rmax" on the horizontal axis shows a critical maximum value of the rotational speed of the rolling rollers 61, and is determined in advance based on a degree of an intended rolling property for keeping (since the rolling property is lowered generally in accordance with an increase of the rotational speed above a specific rotational speed, the allowable maximum rotational speed is approximately determined in correspondence to the degree of the rolling property to be secured), or the capacity of the rolling apparatus 6. Further, "Pmin" on the vertical axis shows a critical minimum value of the rolling property P, and corresponds to an allowable critical value of the rolling property P which is previously set on the basis of a minimum quality required in the shaft portion 12 as a function portion (a rolling property at least required for smoothly and securely rotating the adjustable blade 1), a minimum rolling property required in the shaft portion 12 as a mass produced part, or the like.

The graph mentioned above shows the relationship between the rotational speed R and the rolling property P, that is, a state (a locus) of a change in the rolling property P caused by the rotational speed R, by variously changing the feeding speed V of the rolling roller 61 in the graph in which the rotational speed R and the rolling property P are defined as two different axes. In this case, seeing individually each of the loci in which the feeding speed V is variously changed, it is found in each of the loci that the rolling property P is increased in accordance with an increase of the rotational speed R and the rolling property P is lowered from a certain stage (this is a maximum value). Further, seeing generally each of the loci, it is found that the maximum value is positioned approximately on a straight line (a line on which the respective maximum values are approximately connected is set as a line L). Of course, in the case of seeing each of the loci, it can be seen that the smaller feeding speed V is positioned in an upper side of the graph, and the rolling property P is good as the feeding speed V is slower. In this case, "Vmin" shows a critical minimum value of the feeding speed of the rolling rollers 61, and is a minimum critical value of the feeding speed V which is previously set on the basis of productivity (since the productivity is lowered generally in accordance with reduction of the feeding speed, the allowable minimum feeding speed is approximately determined in correspondence to a level of the minimum productivity to be maintained), or a performance of the rolling apparatus 6 per se, or the like.

Accordingly, the working condition in the rolling process, that is, the rotational speed R and the feeding speed V of the rolling rollers 61 are set in an area AR (in a quadrangle ABCD in FIG. 9) surrounded by the locus at the time of setting the feeding speed V of the roller to the critical minimum value Vmin, the critical maximum value Rmax of the rotational speed of the roller and the minimum value Pmin of the rolling property, in FIG. 9. Further, in the present drawing, reference symbols V1, V2, V3 and V4 are attached to the loci passing through an inner side of the area AR mentioned above in the states (the loci) of the change of the rolling property caused by the rotational speed, obtained by variously changing the feeding speed V (V1<V2<V3<V4).

(d) Particular Setting Procedure

Further, setting a desired rolling property passing through the inner side of the area AR, for example, Pf (of course, a relation Pf>Pmin is established), anywhere on the line Pf within the area AR (for example, a mark X in the drawing) can be employed as the working condition. However, since the productivity is mainly given priority in the actual field, the feeding speed V (Vf in this case) and the rotational speed R (Rf in this case) setting the intersecting point between the line Pf and the line L to the maximum value are set in such a manner as to set both of the feeding speed V and the rotational speed R to be as great as possible. In other words, the feeding speed V and the rotational speed R are set such as to make the desired rolling property Pf the maximum value of the rolling property within the area AR.

In this case, as a matter of convenience for selecting the feeding speed Vf and the rotational speed Rf, there is exemplified the rolling property in which the locus (the locus of Vf) is previously known, however, it is not always necessary that the locus of the rolling property is clarified in order to select the working condition. In other words, in this embodiment, since it has been known that the maximum value of the rolling property is approximately connected onto the line L, the feeding speed Vf can be estimated approximately accurately, for example, from the value of the rotational speed Rf, the other loci of the rolling property and the like, even if the locus of the rolling property is not clear and the feeding speed can not be clearly read from the graph.

As mentioned above, in this embodiment, since the working condition which improves the productivity as much as possible while maintaining the desired rolling property can be easily and accurately selected, and the rotational speed R and the feeding speed V of the rolling roller 61 can be set with a good balance, it is possible to carry out the desirable operation in view of a stability and a reliability of a product quality, whereby the mass production of the adjustable blade 1 in a high quality level can be more actually achieved.

Thereafter, the shaped material W to which rolling is applied is formed into the adjustable blade 1 as a finished product via the grinding step of the end surface of the blade portion (vane height grinding) and the barreling step. However, since these steps are the same as those in embodiment 1, the description will be omitted here.

In this embodiment, the shaft portion 12 of the adjustable blade 1 is rolled by the two rolling rollers 61. However, it is not always necessary to employ the structure mentioned above, and it is possible to use three or more rolling rollers 61 to roll the shaft portion 12. In this connection, in the case of employing three rolling rollers 61, the three rollers may be arranged in such a manner that one is set as a movable roller 61B and the remaining two are set as free rotating rollers 61A, or such that two are set as the movable rollers 61B and the remaining one is set as the free rotating roller 61A.

A description will be given below of effects of the invention. First, in accordance with the invention, the adjustable blade 1 can be manufactured while hardly using the cutting operation, the welding operation or the like which has conventionally required a lot of time for processing. Therefore, it is possible to realize the mass production of the adjustable blade 1, and it is possible to stably supply the adjustable blades 1 as the mass-produced articles to the market. In particular, about 5000 adjustable blades 1 can be manufactured and supplied a day by eliminating the cutting operation from the processing step as much as possible.

Further, also in accordance with the invention, since the rolling allowance can be restricted to an extremely small size, the shaft elongation generated by the rolling can be restricted to the level requiring no correcting by the later cutting operation. Accordingly, it is possible to approximately completely eliminate the cutting operation from the manufacturing step of the adjustable blade 1, whereby the mass production of the adjustable blade 1 can be more actually realized. Further, since the shaft elongation generated by the rolling is restricted as much as possible, it is possible to obtain the adjustable blade 1 having a high dimensional accuracy.

Further, also in accordance with the invention, the form rolling of the shaft portion 12 (the shaft portion forming section 12a) in the adjustable blade 1 is applied only to the part to be rolled 17, to thereby limit the substantial shaft elongation to approximately 0. Accordingly, it is possible to eliminate the more cutting operation from the manufacturing step of the adjustable blade 1, whereby the mass production of the adjustable blade 1 can be more actually achieved.

Further, also in accordance with the invention, the parts to be rolled 17 are formed at the opposite ends of the non-rolled part 18, so that the smooth sliding state of the adjustable blade 1 can be maintained by the non-rolled part 18. Therefore, it is possible to accurately and securely control the flow rate of the exhaust gas G, and it is possible to contribute to an improve of performance of the adjustable blade 1.

Further, also in accordance with the invention, since the metal material flowing in the rolling stays between the part to be rolled 17 and the non-rolled part 18, and forms the excess metal portion e, it is possible to inhibit the excess metal portion e from growing in the direction of the axial length, resulting in the shaft elongation being effectively inhibited.

Further, also in accordance with the invention, it is possible to easily set the rotational speed R and the feeding speed V of the rolling rollers 61 while taking both of the productivity and the rolling property P into consideration. In this connection, when one adjustable blade 1 is rolled at a high speed for a short time, the productivity is improved, but the rolling property is lowered, as well as the shaft elongation, the sharp edge or the like tends to be generated. As mentioned above, it is extremely hard in general to set a working condition which achieves both the productivity and the rolling property, however, in this case, it is extremely easy to set the working condition.

Further, also in accordance with the invention, it is possible to set the working condition while taking into consideration the critical minimum value Vmin of the feeding speed V of the rolling rollers 61, the critical maximum value Rmax of the rotational speed R of the rolling rollers 61, and the critical minimum value Pmin of the rolling property P, and it is possible to select more realistically.

Further, also in accordance with the invention, the desired rolling property Pf equal to or more than the critical minimum value Pmin is previously set, and the rotational speed Rf and the feeding speed Vf of the rolling rollers 61 are selected on the line (the value Pf), so that it is easy to set while securely keeping the desired rolling property Pf.

Further, also in accordance with the invention, it is possible to realize the mass production of the exhaust gas guide assembly A and the VGS turbocharger having a high heat resistance and a high accuracy. Further, it is possible to accurately and securely regulate the flow rate of the exhaust gas G in the high-temperature exhaust gas atmosphere.

INDUSTRIAL APPLICABILITY

As mentioned above, the present invention is suited to the case that it is desired to eliminate the cutting operation requiring a lot of time as much as possible from the manufacturing step of the adjustable blade for the VGS turbocharger and form the shaft portion to have the desired diametrical thickness by rolling at the time of manufacturing the shaft portion. Thus, the shaft elongation and the sharp edge caused by the rolling are extremely inhibited, to thereby eliminate the cutting operation which has been performed for correcting the shaft elongation and the sharp edge, with the result that the mass production of the adjustable blade and the VGS turbocharger or the like which has the adjustable blade incorporated therein can be actually achieved.

The invention claimed is:

1. A method of manufacturing an adjustable blade of a VGS turbocharger, the adjustable blade including a center-of-rotation shaft portion and a blade portion for adjusting a flow rate of exhaust gas, the turbocharger being operable to throttle the exhaust gas discharged from an engine at a relatively low flow rate to increase the velocity of the exhaust gas so that an exhaust turbine wheel of the turbocharger is rotated by energy of the increased-velocity exhaust gas and so that a compressor directly coupled to the exhaust turbine wheel feeds a larger amount of air into the engine than would be fed by natural suction, whereby a high output power of the engine is obtained at low rotational speeds, said manufacturing method comprising:
    providing a starting form of the adjustable blade, the starting form being made of a shaped metal material integrally having a blade portion forming section and a shaft portion forming section;
    rolling the shaft portion forming section of the shaped metal material until the shaft portion forming section has a diametrical thickness substantially equal to a diametrical thickness of the shaft portion of the adjustable blade so as to thereby form the shaft portion of the adjustable blade;
    rotatably fitting a fitting portion of the shaft portion of the adjustable blade into a receiving hole of a frame member positioned outside an outer periphery of the exhaust gas turbine wheel; and
    the fitting portion has a rolled part and a non-rolled part having a diameter smaller than a diameter of the rolled part, wherein said rolling of the shaft portion forming section comprises rolling only a portion of the shaft portion forming section of the shaped metal material corresponding to the rolled part of the fitting portion of the shaft portion.

2. The method of manufacturing of claim 1, wherein the fitting portion of the adjustable blade has respective rolled parts at opposite ends thereof, and has the non-rolled part disposed therebetween.

3. The method of manufacturing of claim 2, wherein a size of a step between the portion of the shaft portion forming section corresponding to the rolled part of the fitting section and a portion of the shaft portion forming section corresponding to the non-rolled part of the fitting portion is larger than a rolling allowance of the rolled part so that metal material of a rolling allowance region flows from the portion of the shaft portion forming section corresponding to the rolled part to the portion of the shaft portion forming section corresponding to the non-rolled part during said rolling.

4. The method of manufacturing of claim 2, wherein said rolling of the shaft portion forming section of the shaped metal material comprises:
    performing said rolling using a set of rollers; and
    selecting a rotational speed of the rollers and a feeding speed at which the set of rollers are moved close to each other by comprehensively judging relative merits of a rolling property on the basis of a shaft elongation and a sharp edge generated by said rolling, a strain accumulated in the shaft portion by said rolling, or a pressing force required for rolling so as to improve productivity as much as possible while maintaining the rolling property at approximately a desired value.

5. The method of manufacturing of claim 1, wherein a size of a step between the portion of the shaft portion forming section corresponding to the rolled part of the fitting section and a portion of the shaft portion forming section corresponding to the non-rolled part of the fitting portion is larger than a rolling allowance of the rolled part so that metal material of a rolling allowance region flows from the portion of the shaft portion forming section corresponding to the rolled part to the portion of the shaft portion forming section corresponding to the non-rolled part during said rolling.

6. The method of manufacturing of claim 5, wherein said rolling of the shaft portion forming section of the shaped metal material comprises:

performing said rolling using a set of rollers; and selecting a rotational speed of the rollers and a feeding speed at which the set of rollers are moved close to each other by comprehensively judging relative merits of a rolling property on the basis of a shaft elongation and a sharp edge generated by said rolling, a strain accumulated in the shaft portion by said rolling, or a pressing force required for rolling so as to improve productivity as much as possible while maintaining the rolling property at approximately a desired value.

7. The method of manufacturing of claim 1, wherein said rolling of the shaft portion forming section of the shaped metal material comprises:

performing said rolling using a set of rollers; and selecting a rotational speed of the rollers and a feeding speed at which the set of rollers are moved close to each other by comprehensively judging relative merits of a rolling property on the basis of a shaft elongation and a sharp edge generated by said rolling, a strain accumulated in the shaft portion by said rolling, or a pressing force required for rolling so as to improve productivity as much as possible while maintaining the rolling property at approximately a desired value.

8. A method of manufacturing an adjustable blade of a VGS turbocharger, the adjustable blade including a center-of-rotation shaft portion and a blade portion for adjusting a flow rate of exhaust gas, the turbocharger being operable to throttle the exhaust gas discharged from an engine at a relatively low flow rate to increase the velocity of the exhaust gas so that an exhaust turbine wheel of the turbocharger is rotated by energy of the increased-velocity exhaust gas and so that a compressor directly coupled to the exhaust turbine wheel feeds a larger amount of air into the engine than would be fed by natural suction, whereby a high output power of the engine is obtained at low rotational speeds, said manufacturing method comprising:

providing a starting form of the adjustable blade, the starting form being made of a shaped metal material integrally having a blade portion forming section and a shaft portion forming section; and rolling the shaft portion forming section of the shaped metal material until the shaft portion forming section has a diametrical thickness substantially equal to a diametrical thickness of the shaft portion of the adjustable blade so as to thereby form the shaft portion of the adjustable blade, said rolling of the shaft portion forming section of the shaped metal material comprising:

performing said rolling using a set of rollers; and selecting a rotational speed of the rollers and a feeding speed at which the set of rollers are moved close to each other by comprehensively judging relative merits of a rolling property on the basis of a shaft elongation and a sharp edge generated by said rolling, a strain accumulated in the shaft portion by said rolling, or a pressing force required for rolling so as to improve productivity as much as possible while maintaining the rolling property at approximately a desired value.

9. The method of manufacturing of claim 8, wherein said selecting of the rotational speed of the rollers and the feeding speed at which the set of rollers are moved close to each other comprises setting the rotational speed and the feeding speed of the rollers within an area on a graph in which the rotational speed of the rollers and the level of the rolling property are defined as two different axes, the area being surrounded by a locus showing a relation between the rotational speed of the rollers and the rolling property at the time of setting the feeding speed of the rollers at a critical minimum value Vmin, a line obtained by setting the rotational speed of the rollers at a critical maximum value Rmax, and a line obtained by setting a level of the rolling property at a critical minimum value Pmin.

10. The method of manufacturing of claim 9, wherein said selecting of the rotational speed of the rollers and the feeding speed at which the set of rollers are moved close to each other further comprises setting a desired rolling property Pf (Pf>Pmin) within the area, and setting the rotational speed of the rollers and the feeding speed of the rollers on a line of the desired rolling property Pf.

11. A method of manufacturing an adjustable blade of a VGS turbocharger, the adjustable blade including a center-of-rotation shaft portion and a blade portion for adjusting a flow rate of exhaust gas, the turbocharger being operable to throttle the exhaust gas discharged from an engine at a relatively low flow rate to increase the velocity of the exhaust gas so that an exhaust turbine wheel of the turbocharger is rotated by energy of the increased-velocity exhaust gas and so that a compressor directly coupled to the exhaust turbine wheel feeds a larger amount of air into the engine than would be fed by natural suction, whereby a high output power of the engine is obtained at low rotational speeds, said manufacturing method comprising:

providing a starting form of the adjustable blade, the starting form being made of a shaped metal material integrally having a blade portion forming section and a shaft portion forming section, said providing of the starting form comprising obtaining the shaped metal material by a precision casting method, by a metal injection molding method, or by shaping a blank punched out from a metal material having a substantially fixed thickness so as to obtain the shaped metal material having a shape and dimensions close to those of the adjustable blade;

rolling the shaft portion forming section of the shaped metal material until the shaft portion forming section has a diametrical thickness substantially equal to a diametrical thickness of the shaft portion of the adjustable blade so as to thereby form the shaft portion of the adjustable blade;

rotatably fitting a fitting portion of the shaft portion of the adjustable blade into a receiving hole of a frame member positioned outside an outer periphery of the exhaust gas turbine wheel; and the fitting portion has a rolled part and a non-rolled part having a diameter smaller than a diameter of the rolled part, wherein said rolling of the shaft portion forming section comprises rolling only a portion of the shaft portion forming section of the shaped metal material corresponding to the rolled part of the fitting portion of the shaft portion.

12. A method of manufacturing an adjustable blade of a VGS turbocharger, the adjustable blade including a center-of-rotation shaft portion and a blade portion for adjusting a flow rate of exhaust gas, the turbocharger being operable to throttle the exhaust gas discharged from an engine at a relatively low flow rate to increase the velocity of the exhaust gas so that an exhaust turbine wheel of the turbocharger is rotated by energy of the increased-velocity exhaust gas and so that a compressor directly coupled to the exhaust turbine wheel feeds a larger amount of air into the engine than would be fed by natural suction, whereby a high output power of the engine is obtained at low rotational speeds, said manufacturing method comprising:

providing a starting form of the adjustable blade, the starting form being made of a shaped metal material integrally having a blade portion forming section and a shaft portion forming section, said providing of the starting form comprising obtaining the shaped metal material by a precision casting method, by a metal injection molding method, or by shaping a blank punched out from a metal material having a substantially fixed thickness so as to obtain the shaped metal material having a shape and dimensions close to those of the adjustable blade; and rolling the shaft portion forming section of the shaped metal material until the shaft portion forming section has a diametrical thickness substantially equal to a diametrical thickness of the shaft portion of the adjustable blade so as to thereby form the shaft portion of the adjustable blade, said rolling of the shaft portion forming section of the shaped metal material comprising:

performing said rolling using a set of rollers; and selecting a rotational speed of the rollers and a feeding speed at which the set of rollers are moved close to each other by comprehensively judging relative merits of a rolling property on the basis of a shaft elongation and a sharp edge generated by said rolling, a strain accumulated in the shaft portion by said rolling, or a pressing force required for rolling so as to improve productivity as much as possible while maintaining the rolling property at approximately a desired value.

* * * * *